United States Patent [19]

Drew

[11] 3,747,877

[45] July 24, 1973

[54] LOAD EQUALIZING SLING
[75] Inventor: Gene R. Drew, El Centro, Calif.
[73] Assignee: The United States of America as represented by the Secretary of the Navy, Washington, D.C.
[22] Filed: Oct. 21, 1971
[21] Appl. No.: 191,277

[52] U.S. Cl............... 244/139, 244/151 R, 294/67, 294/74
[51] Int. Cl............................................. B64d 25/06
[58] Field of Search.................... 244/139, 140, 138, 244/151 R, 151 A, 151 B; 294/67 E, 67 EA, 74

[56] References Cited
UNITED STATES PATENTS

| 2,938,689 | 5/1960 | Rollings | 244/138 R |
| 2,938,747 | 5/1960 | Pitts | 294/67 E |
| 2,356,147 | 7/1944 | Caldwell | 294/74 X |
| 2,356,146 | 8/1944 | Caldwell | 294/74 |
| 2,987,340 | 6/1941 | Mattera | 294/74 X |
| 2,631,797 | 3/1953 | Smith | 244/139 |
| 3,138,348 | 6/1964 | Stahmer | 244/139 X |

Primary Examiner—Milton Buchler
Assistant Examiner—Carl A. Rutledge
Attorney—R. S. Sciascia, G. J. Rubens et al.

[57] ABSTRACT

Apparatus for suspending a load, such as a disabled helicopter, having a tendency to swing and gyrate including at least one sling having a pair of leg sections formed of a continuous flexible line, the lower ends of which are secured to opposite sides on the load, the sling being suspended from a load bearing means through which the line freely passes to equalize the load between both leg portions thereof and on the securing points on the load.

3 Claims, 3 Drawing Figures

PATENTED JUL 24 1973             3,747,877

INVENTOR.
GENE R. DREW
BY
George J. Rubens

LOAD EQUALIZING SLING

CROSS-REFERENCE TO RELATED APPLICATIONS

This invention may be used in conjunction with an invention entitled "Dual Mode Sling for Helicopter Recovery Systems" Ser. No. 200,387 filed on Nov. 19, 1971 by G. R. Drew and B. C. Layman.

BACKGROUND OF THE INVENTION

This invention relates to a load supporting sling, designed primarily for a helicopter parachute recovery system, but it is to be understood that the sling can be used for any purposes for which it is found applicable.

The accelerated use of helicopters in recent years, especially in military deployment, created an urgent requirement for an in-flight helicopter recovery system to save the occupants and equipment when the helicopter is incapacitated for any reason during flight. Although substantial progress has been achieved in pilot-ejected recovery systems for military winged-type aircraft, the presence of the overhead rotating main blades of a helicopter makes conventional pilot ejection system impractical and obviously dangerous.

Accordingly it has been proposed recently in the prior art to sever the helicopter main blades and then deploy a cluster of parachutes anchored to the helicopter fuselage through a fixed-length sling system. The fixed sling system is composed of two pair of slings with four independent, fixed-length lines, two lines anchored at their lower ends to forward fuselage points on opposite sides thereof and two lines fixed at aft fuselage points. The upper ends of these four sling lines are each anchored to a fixture at their confluence point, being the point of attachment for a suspension line to a cluster of recovery parachutes.

In such a prior art system, when the parachutes are initially deployed, the drag created causes them to be retarded while the aircraft continues in its forward flight. Since the parachute riser line will extend angularly more in line with the forward sling as compared to the aft sling, the parachute force will be applied primarily on the forward sling and their fuselage attachment points—the aft sling being in a relaxed and unloaded condition. In addition, if during this condition the helicopter yaws or rolls to the port or starboard, the corresponding leg of the forward sling and its fuselage attachment point will be subject to the entire parachute drag force. At airspeed higher than approximately 75 knots, the parachute drag force approach the 100,000 lbf range, and the forward fuselage attachment points will fail structurally unless they are adequately designed to withstand these high parachute opening shock forces. Under the prior art system, the fuselage bracket or the like at each sling attachment point was designed to withstand two times the fuselage weight, i.e., for a helicopter fuselage weight of 15,000 lb., each attachment point could withstand 30,000 lbf. Therefore, the prior art recovery system was limited to recovery only at relatively low velocity, or as an alternative, the system operation would be penalized by the weight of additional fuselage structure required to withstand the high parachute force. It has been an established U. S. Navy design doctrine that the installation of a recovery system in a helicopter is impractical if the system is limited to relatively low speeds, or if the weight of the recovery system, (including the fuselage-sling attachment structure) exceeds approximately four percent of the recovered helicopter weight.

SUMMARY OF THE INVENTION

A sling is proposed especially suitable for recovery of helicopters in flight that by equalizing the load between the legs of the forward sling enables the helicopter to be recovered at higher airspeeds, and also enables the strength required of the fuselage attachment structure to be within Navy tolerances. This is accomplished by forming the forward sling, where there is more than one sling, with a pair of leg members fabricated of a continuous line of U-shape configuration supported at its confluence by a low friction load bearing device, i.e., a pulley. The lower ends of the sling legs are attached, as before, to points on each side of the fuselage. When the parachutes are initially deployed when the helicopter is in flight, the total drag forces on the forward sling, caused by the parachute snatch forces and the helicopter yawing maneuver, are equalized between the two leg sections insuring that the load will be equally distributed between the respective fuselage attachment points. It is believed that by equalizing these snatch forces in the sling members the total parachute load which can be applied safely, can be approximately doubled, as compared with the prior art system previously described.

STATEMENT OF THE OBJECTS OF INVENTION

It is a principal object of the invention to enable a sling system to support a greater load; and where the system is employed in helicopter recovery, to be deployed at a greater airspeed.

Still another important object is to devise a sling system which will equalize the load on the sling legs.

Still other important objects are to develop a sling system that will be more reliable, have a lower weight, and which will support the load with a zero trim angle.

Other objects, advantages and novel features of the invention will become apparent from the following detailed description of the invention when considered in conjunction with the accompanying drawings.

DESCRIPTION OF PREFERRED EMBODIMENT

Figure 1:
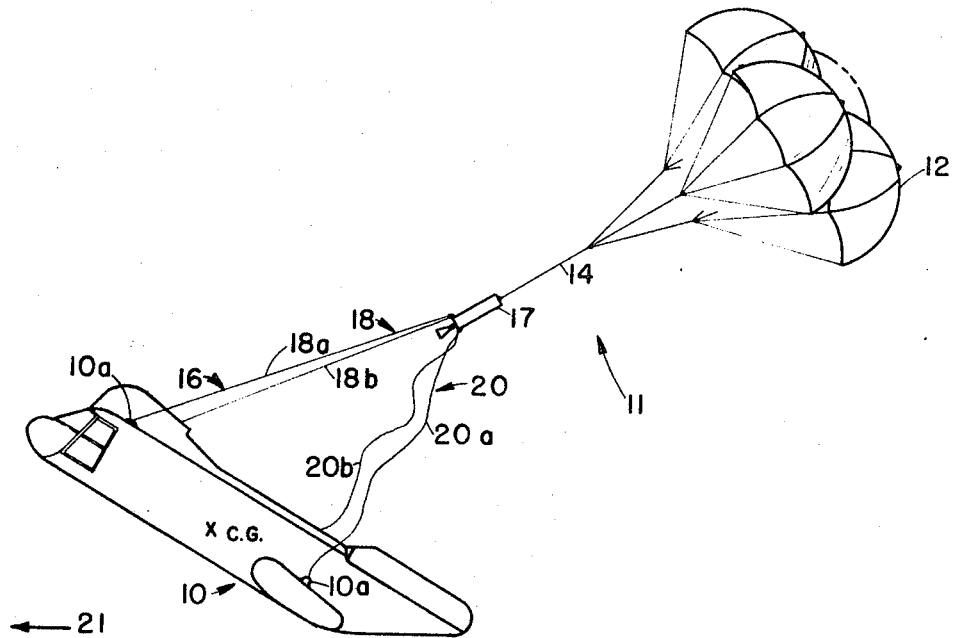
FIG. 1 is a diagrammatic side elevation view of the novel sling supporting a load, such as a helicopter disabled while in flight, showing the helicopter being pitched upward due to the high opening forces of the recovery parachute.
Figure 2:
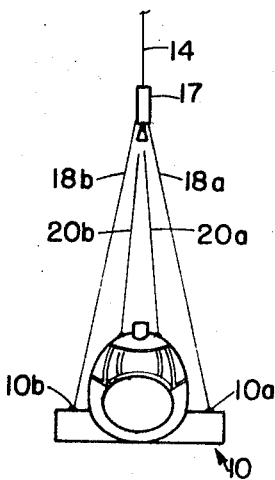
FIG. 2 is an end elevation view of the helicopter being suspended by the novel sling after the initial parachute opening shock forces have been dissipated showing the disposition of the retro-rocket.

Referring to the drawings where like reference numerals refer to similar parts throughout the figures, there is shown in FIG. 1 a load 10, such as a disabled helicopter, being suspended by a parachute recovery system 11 including riser line 14, and a novel sling apparatus 16. The sling apparatus includes a load bearing device 17 from which is suspended the upper ends of a pair of forward and aft slings 18 and 20, respectively, each having two leg sections 18a and 18b and 20a and 20b, respectively attached at their lower ends to both sides of the helicopter fuselage at points 10a and 10b (see FIG. 2).

FIG. 1 diagrammatically illustrates the condition of the disabled helicopter 10 after it has jettisoned the main rotating blades, not shown, having deployed the parachute recovery system in a manner well known in the art. When recovery is initiated, helicopter 10 is assumed to be on a normally level forward flight, as indicated by arrow 21. Thus, when the parachutes are initially deployed, helicopter 10 obviously will continue in its forward flight while the parachutes 12 assume a trailing position because of the large drag area. The parachute riser line 14 will be oriented more in line with the forward sling 18 causing legs 20a and 20b of the aft sling to be slack. Therefore, the parachute opening forces will be transmitted primarily to the forward sling legs 18a and 18b while the aft sling legs carry little, if any, of the parachute opening load. It should be noted that where the helicopter is disabled at high operating speeds that at initial parachute opening the parachute force vector passes well forward of the c.g. of the helicopter causing it to experience a high upward pitching moment.

A solution to this high pitching movement is presented in my copending patent application herein before identified.

In the prior art helicopter recovery systems, all of the forward and aft sling legs are each fabricated as separate elements of a finite fixed length, being anchored by pins or the like at their upper ends to the load bearing device. As a consequence, if helicopter 10 is yawing to the left or to the right when the parachutes are initially deployed, the entire parachute cluster drag forces can be applied to one leg, i.e., 18a or 18b of the forward sling and to only one of the corresponding forward fuselage attachment points.

As previously described in the background section of this application, under such yawing conditions of the helicopter it was necessary to either strengthen substantially the structure of the fuselage attachment points, hopefully within acceptable Navy tolerances, or, as an alternative, limit the prior art recovery systems to recovery of the helicopter at relatively low speeds in order to reduce the applied force, a condition that may make the recovery system too limited for Navy use.

Figure 3:
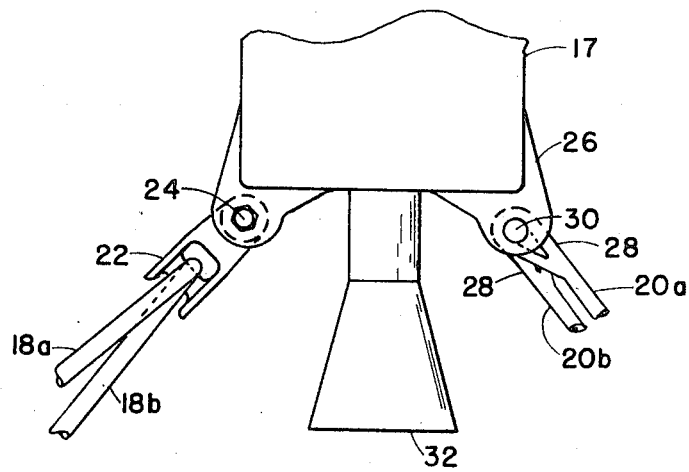
FIG. 3 is an enlarged side elevation view of the upper ends of the two slings where attached to the load bearing block.

The novel sling apparatus, as shown in detail in FIG. 3, functions to equalize the parachute drag forces between legs 18a and 18b of the forward sling, and, thereby, equalize the shock forces that are applied to fuselage attachment points 10a and 10b. This result is achieved by fabricating forward sling legs 18a and 18b of a continuous length of conventional line, and reeving said line through a low friction device, i.e., a simple, free-rolling 22 pinned at 24 to the forward end of a housing plate 26 of load bearing device 17.

The rear sling legs 20a and 20b can be made continuous and similarly supported as is forward sling legs, although such a construction is not needed to supplement the stabilizing effect of the forward sling. Instead, it is preferred that they remain as in the prior art of finite fixed length and each upper end anchored to plate 26 by a looped end 28 and pin 30.

For recovery of large, heavy helicopters, one of more retro rockets 32 may be mounted on plate 26 intermediate the attachment points for the forward and rear slings 18 and 20 and with its nozzle end oriented downward an outboard with respect to the helicopter.

OPERATION

At any time a helicopter becomes disabled in flight the pilot initiates the invention recovery system. In past systems this procedure entailed first the explosive severing of the main rotating blades, and the subsequent deployment of the parachute cluster 12 and retro rocket 32. As the helicopter will normally continue in its forward flight, as indicated by arrow 21, the rearwardly directed drag exerted by parachute cluster 12 causes the drag forces to be concentrated on forward sling 18, the helicopter being pitched upwardly as shown in FIG. 1. In the event that the helicopter has rolled or yawed during parachute deployment legs 18a and 18b, being continuous in length will assume different lengths, but because of pulley 22 the tension forces on each leg will be equalized and the parachute drag forces are applied equally to fuselage attachment points 10a and 10b.

SUMMARY OF THE INVENTION

The novel equalizing sling enables its use in a helicopter recovery system with reduced complexity and weight while achieving increased system reliability. By equalizing the load between the forward sling legs, helicopter recovery can be effected at higher flight speeds without requiring structural reinforcement at the fuselage attachment points.

Obviously many modifications and variations of the present invention are possible in the light of the above teachings. It is therefore to be understood that within the scope of the appended claims the invention may be practiced otherwise than as specifically described.

What is claimed is:

1. A force-equalizing apparatus for supporting a suspended load having a tendency to pitch and yaw comprising:
   at least two slings including forward and aft pairs of leg sections adapted to be attached to points on opposite sides on the load;
   said forward pair of leg sections formed of a continuous length of flexible line;
   load bearing means from which each of said slings are suspended and through which the forward leg sections freely pass;
   at least one retro-rocket mounted on said load bearing means with its nozzle directed downwardly;
   whereby during movement the load forces are equally transmitted between the forward leg sections.

2. A force-equalizing apparatus in a parachute recovery system for a helicopter disabled in flight having a tendency to pitch and yaw comprising:
   a pair of forward and aft slings, each sling having two leg sections adapted to be attached at their lower ends to points on opposite sides of the helicopter fuselage;
   said forward sling leg sections being formed of a continuous length of flexible line;
   load bearing means attached to the parachute and from which each sling is suspended including a free-rolling pulley having a minimum of resistance for supporting only the forward leg sections;

said aft sling leg sections each being of finite length having their upper ends fixed to the load bearing means;

whereby the changing load forces caused by the yawing and pitching of the suspended helicopter are equally transmitted instantaneously between both forward leg sections.

3. The apparatus of claim 2 wherein at least one retro-rocket is mounted on the load bearing means with its nozzle directed downward toward the helicopter to produce an upward thrust to assist the parachute in supporting the helicopter during descent.

* * * * *